United States Patent
Wei

(10) Patent No.: US 9,888,388 B2
(45) Date of Patent: Feb. 6, 2018

(54) SIGNALING METHOD FOR SHARING UNLICENSED SPECTRUM BETWEEN DIFFERENT RADIO ACCESS TECHNOLOGIES AND RELATED APPARATUSES USING THE SAME

(71) Applicant: Acer Incorporated, New Taipei (TW)

(72) Inventor: Hung-Yu Wei, New Taipei (TW)

(73) Assignee: Acer Incorporated, New Taipei (TW)

( * ) Notice: Subject to any disclaimer, the term of this patent is extended or adjusted under 35 U.S.C. 154(b) by 151 days.

(21) Appl. No.: 14/863,463

(22) Filed: Sep. 24, 2015

(65) Prior Publication Data

US 2016/0100318 A1   Apr. 7, 2016

Related U.S. Application Data

(60) Provisional application No. 62/059,168, filed on Oct. 3, 2014.

(51) Int. Cl.
| | |
|---|---|
| *H04W 16/14* | (2009.01) |
| *H04W 88/06* | (2009.01) |
| *H04W 84/04* | (2009.01) |
| *H04W 84/12* | (2009.01) |

(52) U.S. Cl.
CPC .......... *H04W 16/14* (2013.01); *H04W 88/06* (2013.01); *H04W 84/042* (2013.01); *H04W 84/12* (2013.01)

(58) Field of Classification Search
None
See application file for complete search history.

(56) References Cited

U.S. PATENT DOCUMENTS

| | | |
|---|---|---|
| 2013/0095845 A1 | 4/2013 | Lim et al. |
| 2014/0112180 A1 | 4/2014 | Axmon et al. |
| 2015/0236782 A1* | 8/2015 | Kadous ................ H04B 7/2643 370/337 |

FOREIGN PATENT DOCUMENTS

| | | |
|---|---|---|
| WO | 2014111309 | 7/2014 |
| WO | 2014138523 | 9/2014 |

OTHER PUBLICATIONS

"Study on Licensed-Assisted Access using LTE," Ericsson et al., 3GPP TSG RAN Meeting #65 RP-141664, Edinburgh, Scotland, Sep. 9-12, 2014, pp. 1-7.

* cited by examiner

*Primary Examiner* — Kouroush Mohebbi
(74) *Attorney, Agent, or Firm* — JCIPRNET

(57) ABSTRACT

The disclosure is directed to a signaling method for sharing an unlicensed spectrum between different radio access technologies used by a base station and a multi-mode wireless device, a multi-mode wireless device using the same method, and a base station using the same method. According to one of the exemplary embodiments, the disclosure is directed to a signaling method for sharing an unlicensed spectrum between different radio access technologies used by a base station. The method may include not limited to receiving a first transmission via a receiver of a first radio access technology over an unlicensed spectrum, calculating a channel information of the first transmission in response to receiving the first transmission, configuring a second transmission based on the first channel information of the first transmission, and transmitting the second transmission via a transmitter of a second radio access technology over the unlicensed spectrum.

24 Claims, 14 Drawing Sheets

SIGNALING METHOD FOR SHARING UNLICENSED SPECTRUM BETWEEN DIFFERENT RADIO ACCESS TECHNOLOGIES AND RELATED APPARATUSES USING THE SAME

CROSS REFERENCE TO RELATED APPLICATION

This application claims the priority benefit of U.S. provisional application Ser. No. 62/059,168 filed on Oct. 3, 2014. The entirety of the above-mentioned patent application is hereby incorporated by reference herein and made a part of specification.

TECHNICAL FIELD

The disclosure is directed to a signaling method for sharing an unlicensed spectrum between different radio access technologies used by a base station and a multi-mode wireless device, a multi-mode wireless device using the same method, and a base station using the same method.

BACKGROUND

Conventionally, a wireless communication system operates in a proprietary radio frequency (RF) spectrum in which base stations and wireless terminals communicate through the proprietary RF spectrum licensed to a wireless operator. Recently, there have been discussions of wireless communication systems expanding usages into a free spectrum which is also known as an unlicensed spectrum, such as the Industrial, Scientific and Medical RF spectrum (ISM band) or other spectrums that are not proprietary and thus are free for public uses. The possibilities of Long Term Evolution (LTE) or LTE-advanced communication systems expanding into the unlicensed spectrums have drawn attention from telecommunication equipment vendors and operators. One reason for such interest is the potential overcrowding of licensed spectrums. In order to provide high throughput services to more users, expansions into unlicensed spectrums might deliver benefits for wireless communication systems.

In 2014 September, a new study item, namely "Study on Licensed-Assisted Access using LTE" was approved for investigations related to 3GPP Release 13. The framework for Licensed-Assisted Access (LAA) to unlicensed spectrum has also been known as Unlicensed LTE (LTE-U), which may potentially be a key feature for the next generation cellular system.

Challenges related a conventional cellular system operating in unlicensed spectrums would include operations within an environment of uncertainty as well as other potential co-existing issues. As the communications is conducted in unlicensed or shared spectrum, there might be other communications devices (using the same radio access technology or different radio access technology) that would like to use the same unlicensed spectrum or have already been using the same unlicensed spectrum. For example, communications of a LTE system may need to operate under uncertain behaviors of other devices which are not under the domain of the control of the LTE wireless system. More specifically, a LTE communication system might need to co-exist with Wi-Fi radios.

In an unlicensed band, a device under the domain of a LTE system might not be able to transmit or receive at any given time because of the spectrum sharing. This is different from the conventional cellular LTE operation in which the spectrum is licensed for transmission or receiving and thus the LTE system has an exclusive control of the licensed spectrum. In order to cope with the uncertainty, the current LTE communication system would need to undergo modifications in order to co-exist with devices that are not under the domain of the LTE communication system. In addition to modifications to cope with such uncertainty, transmissions or receptions of signaling messages in the unlicensed spectrum would need to be efficiently designed.

To be more specific, one potential challenge associated with spectrum sharing among different radio access technologies could be related to channel measurements. Although a base station may use its licensed band to communicate essential information a user equipment (UE), as long as the unlicensed spectrum is to be used, channel measurements of the unlicensed spectrum between a base station and a UE would need to be performed. For example, a base station may typically transmit a reference signal or a pilot signal which is to be received by a UE. The UE may then perform a channel measurement based on the reference signal or the pilot signal. The reference signal could be, for example, the channel state information reference signal (CSI-RS). After acquiring the CSI-RS, the UE may then measure the CSI which could then be fed back to the base station. However, as both LTE-U devices and Wi-Fi devices may generally perform channel measurements to be transmitted back to a base station or a Wi-Fi access point (AP) by using the same unlicensed spectrum, interferences may occur if spectrum sharing is accomplished in an uncontrolled manner.

SUMMARY OF THE DISCLOSURE

Accordingly, the disclosure is directed to a signaling method for sharing an unlicensed spectrum between different radio access technologies used by a base station and a multi-mode wireless device, a multi-mode wireless device using the same method, and a base station using the same method.

In one of the exemplary embodiments, the disclosure is directed to a signaling method for sharing an unlicensed spectrum between different radio access technologies used by a base station. The method would include not limited to receiving a first transmission via a receiver of a first radio access technology over an unlicensed spectrum, calculating a channel information of the first transmission in response to receiving the first transmission, configuring a second transmission based on the first channel information of the first transmission, and transmitting the second transmission via a transmitter of a second radio access technology over the unlicensed spectrum.

In one of the exemplary embodiments, the disclosure is directed to a multi-mode base station that supports multiple radio access technologies. The base station would include not limited to a receiver of a first radio access technology configured for receiving a first transmission over an unlicensed spectrum; a processor coupled to the receiver and is configured for calculating a channel information of the first transmission in response to receiving the first transmission; and configuring a second transmission based on the channel information of the first transmission; and a transmitter coupled to the processor and is configured for transmitting the second transmission via a transmitter of a second radio access technology over the unlicensed spectrum.

In one of the exemplary embodiments, the disclosure is directed to a signaling method for sharing an unlicensed spectrum between different radio access technologies used by a multi-mode wireless device that supports multiple radio access technologies. The method would include not limited to receiving a first transmission via a receiver of a first radio access technology over an unlicensed spectrum; calculating a first channel information of the first transmission in response to receiving the first transmission; and transmitting a second transmission via a transmitter of a second radio access technology over the unlicensed spectrum.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
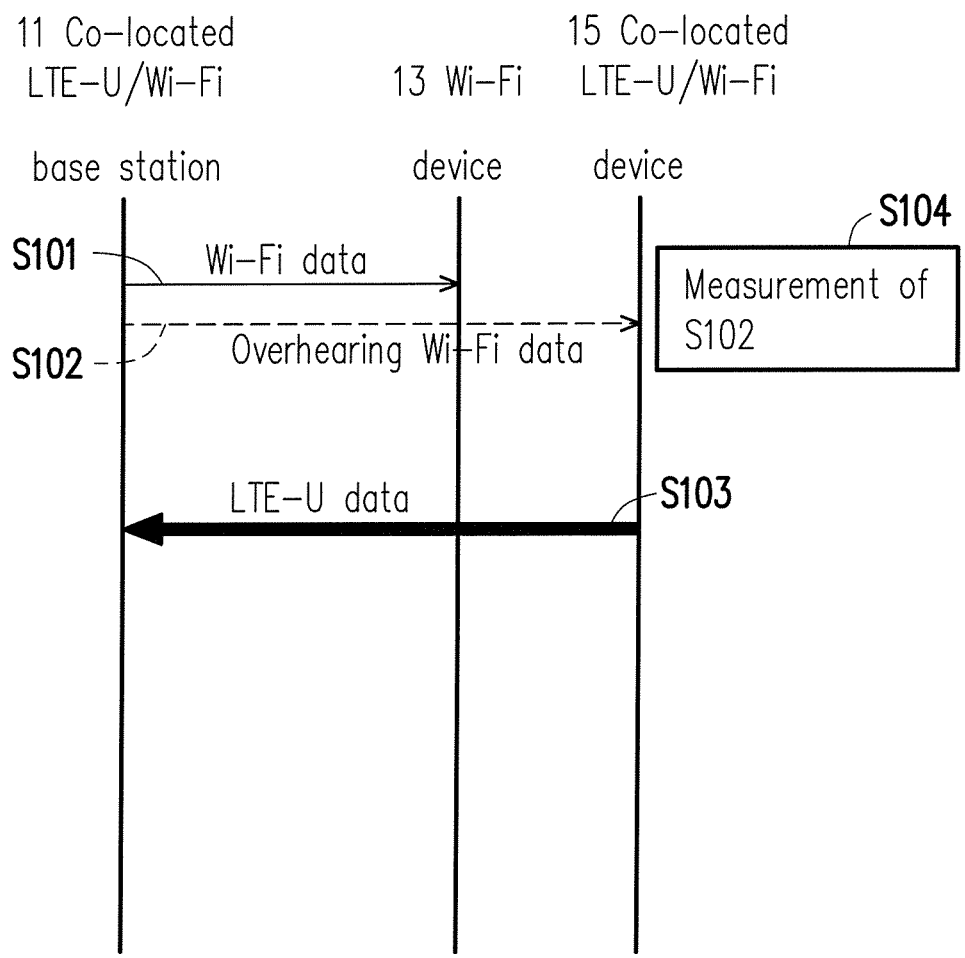
FIG. 1 is a signaling diagram which illustrates a method of sharing an unlicensed spectrum between different access technologies which involves a channel measurement in accordance with one of the exemplary embodiment of the disclosure.

Reference will now be made in detail to the present exemplary embodiments of the disclosure, examples of which are illustrated in the accompanying drawings. Wherever possible, the same reference numbers are used in the drawings and the description to refer to the same or like parts.

As transmitting or receiving opportunities are uncertain, an unlicensed LTE carrier could be configured strategically. In order for different radio access technologies to co-exist, a base station or an eNB could be designed to provide multi-mode accesses such as the Licensed-Assisted LTE Access and Wi-Fi in unlicensed spectrum. Some multi-mode wireless devices or user equipment could also be designed to have Licensed-Assisted LTE radio and IEEE 802.11 based Wi-Fi radio. The same wireless infrastructure node (e.g., base station or access point) or the same wireless device that hosts more than one radio access technologies in an unlicensed band could be termed a co-located node or a co-located device for the reason that even though Licensed-Assisted LTE Access and Wi-Fi radio access technologies are different, their underlying wireless channels could be substantially the same, assuming that both LTE-U and Wi-Fi radio use the same unlicensed spectrum or the unlicensed spectrum that overlaps a significant portion. As a result, wireless radio conditions such as a channel state information (CSI), an interference level, or a MIMO spatial channel state could be substantially the same or highly correlated for Licensed-Assisted LTE radio and IEEE 802.11 based Wi-Fi radio using the same spectrum. By using correlated channel information, the system performance could be improved because of the extra information (collected from different radios) and the reduced signaling exchange as the frequency of signaling exchange could be reduced. In this disclosure, a signaling method to indicate a co-located base station or a co-located wireless device is described. In addition, after receiving the indication of the co-located information, operational mechanisms of a wireless communication system operation would also described.

Figure 10:
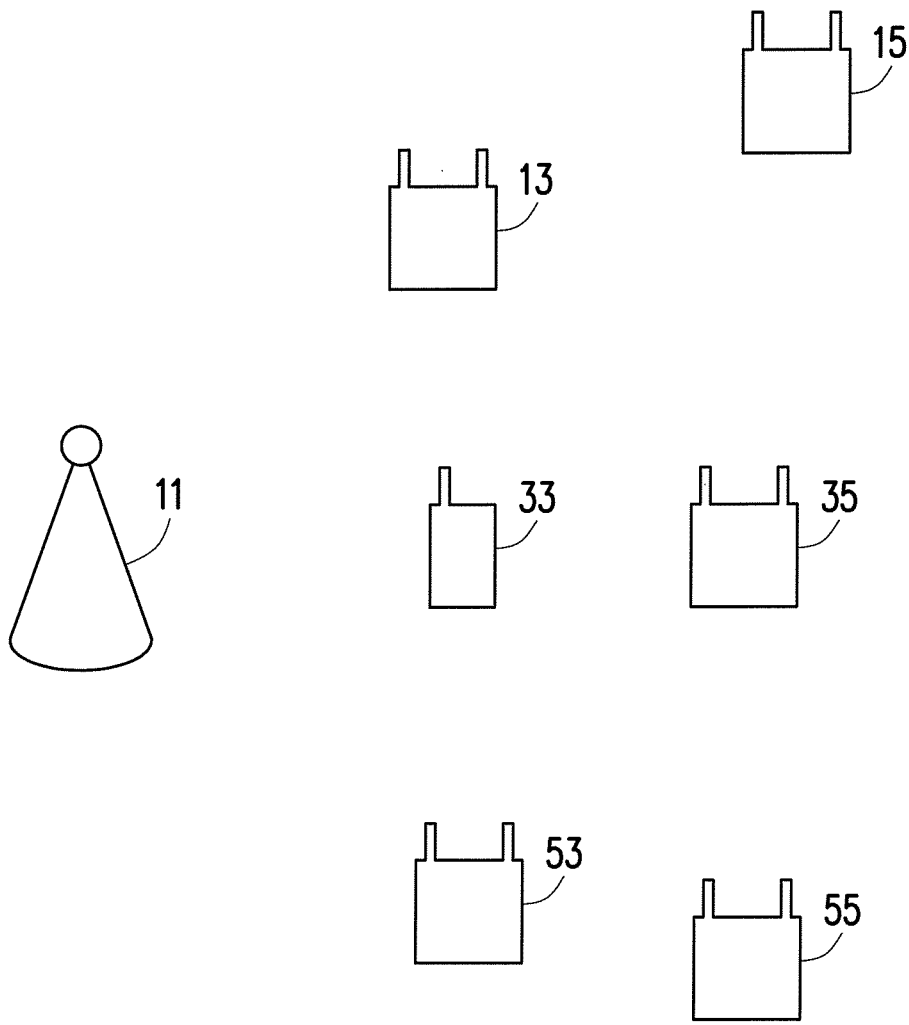
FIG. 10 illustrates an exemplary scenario in which the licensed-assisted access (LTE-U) co-exists with the Wi-Fi radio access technologies.

FIG. 10 illustrates an example of a wireless communication system that share an unlicensed spectrum. The wireless communication system is not limited to LTE-U and Wi-Fi operations. Referring to the example of FIG. 10, the communication system could include not limited to a base station or an eNB 11, a Wi-Fi device 13 (i.e., a UE that possesses a Wi-Fi transceiver), a LTE-U device 33 (i.e., a UE that possesses a LTE-U transceiver), a Wi-Fi AP 53, and a plurality of multi-mode wireless devices (e.g., 15, 35, 55) which are devices that support multiple radio access technologies. The devices including 13, 33, 53, 15, 35, 55 may exist within a service coverage area of the BS 11 which may operate with the Wi-Fi protocol and the LTE-U protocol alongside with the conventional LTE/LTE-A protocol. For example, the BS 11 may provide control signaling for activating LTE-U data transmission through LTE protocol in the licensed spectrum.

Figure 11:
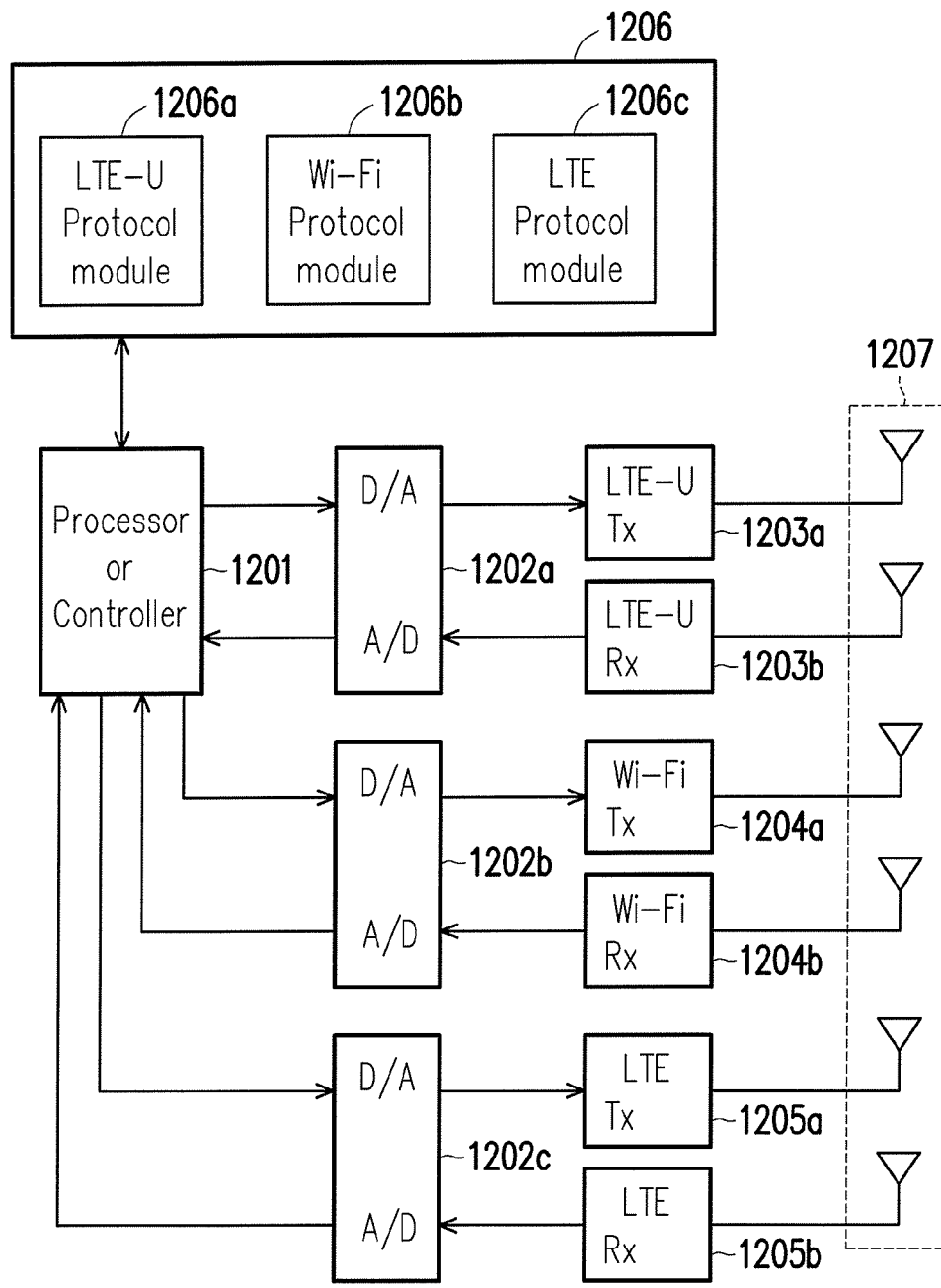
FIG. 11 illustrates the hardware of an exemplary base station in terms of functional block diagrams.

FIG. 11 illustrates the hardware of an exemplary base station (e.g., 11) in terms of functional block diagrams. The term "base station" (BS) in this disclosure could represent various embodiments which for example could include but not limited to a Home Evolved Node B (HeNB), an eNB, a node B, a macro BS, a pico BS, an advanced base station (ABS), a base transceiver system (BTS), an access point (AP), a home base station, a relay station, a scatterer, a repeater, an intermediate node, an intermediary, and/or satellite-based communications base stations.

From the hardware perspective, a BS may include at least the functional elements as illustrated in FIG. 11. Referring to FIG. 11, a BS would include at least but not limited to a processor and/or a controller 1201 (hereinafter referred to as "processor 1201"), one or more digital-to-analog (D/A)/analog-to-digital (A/D) converters 1202a~1202c, optionally a LTE-U transmitter (TX) 1203a and a LTE-U receiver (RX) 1203b, a Wi-Fi TX 1204a and a Wi-Fi RX 1204b, a LTE TX 1205a and a LTE RX 1205b, a non-transitory storage medium 1206, and an antennas 1207.

The processor 1201 is configured to process digital signal and to perform procedures of the proposed signaling method of sharing an unlicensed spectrum between different radio access technologies described in the following in accordance with exemplary embodiments of the present disclosure. Also, the processor 1201 may be coupled to a memory module 1206 to store software programs such as a LTE-U protocol module 1206a, a Wi-Fi protocol module 1206b, and a LTE protocol module 1206c, programming codes, device configurations, a codebook, buffered or permanent data, and so forth. The processor 1201 is configured to access and execute the modules recorded in the memory module 1206. The functions of the processor 1201 could be implemented by using programmable units such as a micro-processor, a micro-controller, digital signal processor (DSP) chips, a field-programmable gate array (FPGA), etc. The functions of the processor 1201 may also be implemented with separate electronic devices or ICs, and functions performed by the processor 1201 may also be implemented within the domains of either hardware or software.

The LTE-U protocol module 1206a would support LTE-U protocol. That means the processor 1201 executed the LTE-U protocol module 1206a would convert a digital message into a format that is compatible with LTE-U protocol, and could access the cellular network such as Evolved Universal Terrestrial Radio Access Network (E-UTRAN). The Wi-Fi protocol module 1206b would support 802.11 (or Wi-Fi) protocol. That means the processor 1201 executed the Wi-Fi protocol module 1206b would convert a digital message into a format that is compatible with Wi-Fi protocol according to the IEEE 802.11 standard or similar standards such as IEEE 802.11x, and could access the wireless local access network (WLAN). The LTE protocol module 1206c would support LTE protocol. That means the processor 1201 executed the LTE protocol module 1206c would convert a digital message into a format that is compatible with LTE protocol, and could access the cellular network such as E-UTRAN. Notice that the LTE protocol module 1206c may be optionally combined with 3G and/or 2G protocol module.

In addition, the processor 1201 of the BS may be used to coordinate different RATs. For example, the processor 1201 of the BS may coordinate two or more RATs such as radio operations of Wi-Fi and LTE-U using the same unlicensed spectrum. The processor 1201 of the BS may coordinate radio technologies such as radio operation LTE using licensed spectrum and unlicensed spectrum. A UE may communicate with a BS using both licensed spectrum and unlicensed spectrum.

It should be noticed that the BS may operate as a combination of at least two devices. One device such as an eNB is used for handling the LTE and LTE-U operations, and another device such as a Wi-Fi AP for handling the Wi-Fi operation. The two devices of the BS may have their own processor or controller, and have an inter-base station interface between two devices for exchanging control signals between the LTE and LTE-U operations and the Wi-Fi operation. The inter-base station interface may be for example but not limited to cable, fiber, or radio interface. For example, a control signal may be used for configuring a contention free period in the unlicensed spectrum.

In another embodiment, the BS may operate as a traditional BS but with LTE-U capability. The processor 1201 of the BS may be used for handling all LTE, LTE-U, and Wi-Fi operations, and include an inter-base station interface for exchanging control signals of a coordinating configuration between each two protocol modules of the LTE-U protocol module 1206a, the Wi-Fi protocol module 1206b, and the LTE protocol module 1206c. The inter-base station interface may be a physical or virtual line established by cable or software.

The D/A/A/D converters 1202a~1202c is configured to convert from an analog signal format to a digital signal format during uplink signal processing and from a digital signal format to an analog signal format during downlink signal processing.

The LTE-U TX 1203a and the LTE-U RX 1203b operated at an unlicensed spectrum such as 5 GHz, 2.4 GHz, other Industrial, Scientific and Medical (ISM) radio bands, or Unlicensed National Information Infrastructure (U-NII) band are respectively used for transmitting and receiving modulated signals which could be wireless RF signals (through one or more antennas 1207) for LTE-U protocol module 1206a. The Wi-Fi TX 1204a and the Wi-Fi RX 1204b operated at the unlicensed spectrum are respectively used for transmitting and receiving modulated signals which could be wireless RF signals (through one or more antennas 1207) for Wi-Fi protocol module 1206b. The unlicensed spectrum operated by the LTE-U TX 1203a, the LTE-U RX 1203b, Wi-Fi TX 1204a, and the Wi-Fi RX 1204b may be the same or different. In addition, the LTE-U TX 1203*a*, the LTE-U RX 1203*b*, Wi-Fi TX 1204*a*, and the Wi-Fi RX 1204*b* may be used for sensing the transmission of other devices in the unlicensed spectrum. The LTE TX 1205*a* and the LTE RX 1205*b* operated at a licensed spectrum such as frequency bands 700 MHz, 850 MHz, 1800 MHz, 1900 MHz, 2100 MHz, and etc are respectively used for transmitting and receiving modulated signals which could be wireless RF signals (through one or more antennas 1207) for LTE protocol module 1206*c*. The LTE-U TX 1203*a* and the LTE-U RX 1203*b*, the Wi-Fi TX 1204*a* and the Wi-Fi RX 1204*b*, and the LTE TX 1205*a* and the LTE RX 1205*b* may also perform operations such as low noise amplifying, impedance matching, frequency mixing, up or down frequency conversion, filtering, amplifying, and so like.

The memory module 1206 may be a fixed or a movable device in any possible forms including non-transitory computer readable recording medium such as a random access memory (RAM), a read-only memory (ROM), a flash memory or other similar devices, or a combination of the above-mentioned devices.

Figure 12:
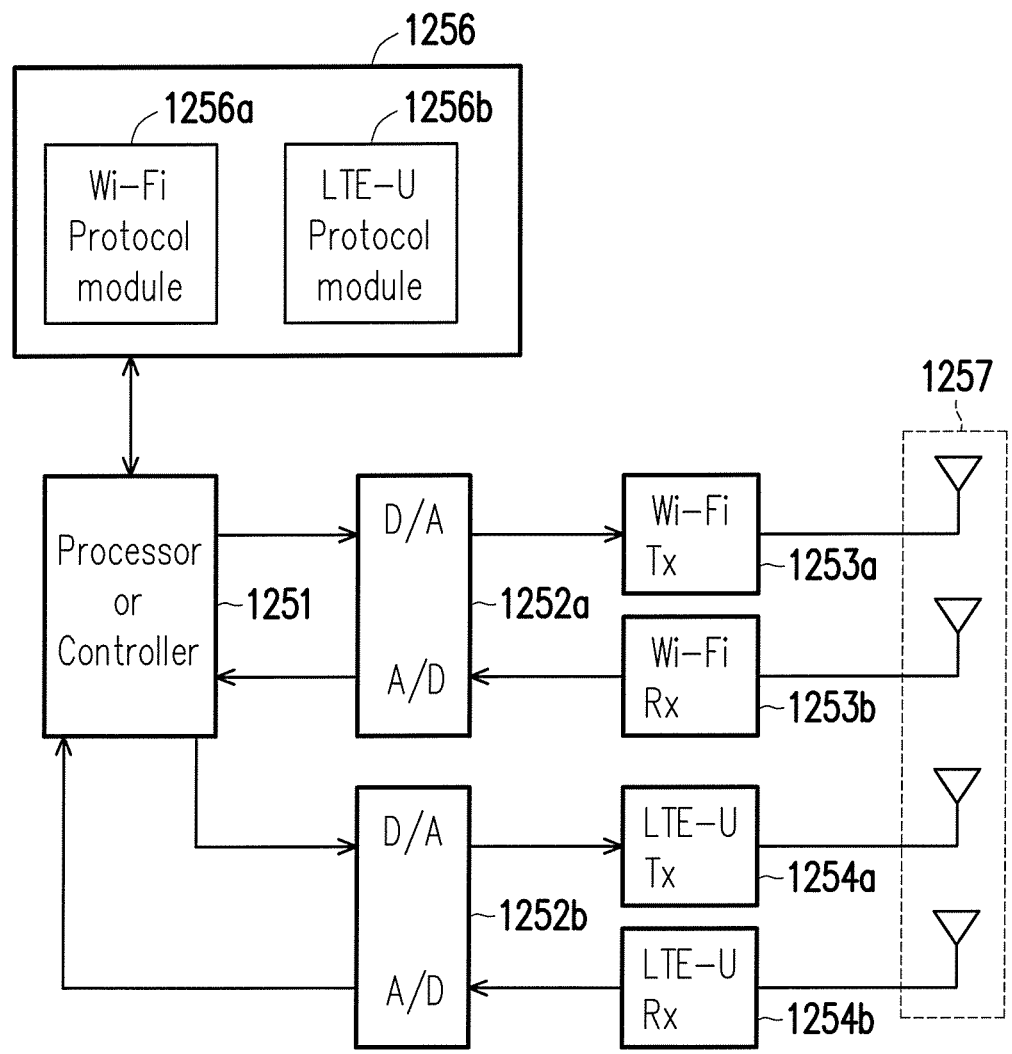
FIG. 12 illustrates the hardware of an exemplary multi-mode wireless device in tell is of functional block diagrams.

FIG. 12 illustrates the hardware of an exemplary multi-mode wires device in terms of functional block diagrams. A multi-mode wireless device in this disclosure would support multiple radio access technologies and could represent various embodiments which for example could include but not limited to a desktop computer, a laptop, a computer, a server, a client, a workstation, a personal digital assistant (PDA), a tablet personal computer (PC), a scanner, a telephone device, a pager, a camera, a television, a hand-held video game device, a musical device, a wireless sensor, and so like. In some applications, a multi-mode wireless device may be a fixed computer device operating in a mobile environment, such as a bus, train, an airplane, a boat, a car, and so forth.

From the hardware perspective, a multi-mode wireless device may be represented by at least the functional elements as illustrated in FIG. 12 in accordance with an embodiment of the present disclosure. Referring to FIG. 12, the multi-mode wireless device 250 would include but not limited to a processor and/or a controller 1251 (hereinafter referred to as "processor 1251"), one or more D/A/A/D converters 1252*a*~252*b*, a Wi-Fi TX 1253*a* and a Wi-Fi RX 1253*b*, optionally a LTE-U TX 1254*a* and a LTE-U RX 1254*b*, a memory module 1256, and antennas 1257.

The processor 1251 is configured to process digital signal and to perform procedures of the proposed signaling method of sharing an unlicensed spectrum between different radio access technologies described in the following in accordance with exemplary embodiments of the present disclosure. Also, the processor 1251 may be coupled to a memory module 1256 to store software programs such as a Wi-Fi protocol module 1256*a* and a LTE-U signaling module 1256*b*, programming codes, device configurations, a codebook, buffered or permanent data, and so forth. The processor 1251 is configured to access and execute the modules recorded in the memory module 1256. The functions of the processor 1251 could be implemented by using programmable units such as a micro-processor, a micro-controller, DSP chips, a FPGA, etc. The functions of the processor 1251 may also be implemented with separate electronic devices or ICs, and functions performed by the processor 1251 may also be implemented within the domains of either hardware or software.

The Wi-Fi protocol module 1256*a* would support 802.11 (or Wi-Fi) protocol. That means the processor 1251 executed the Wi-Fi protocol module 1256*a* would convert a digital message into a format that is compatible with Wi-Fi protocol, and could access the WLAN. The LTE-U signaling module 1256*b* would support LTE-U protocol. That means the processor 1251 executed the LTE-U signaling module 1256*b* would convert a digital message into a format that is compatible with LTE-U protocol, and could access the cellular network such as E-UTRAN.

In addition, the processor 1251 may be used to coordinate different RATs. For example, the processor 1251 may coordinate two or more RATs such as radio operations of Wi-Fi and LTE-U using the same unlicensed spectrum.

The D/A/A/D converters 1252*a*~1252*b* is configured to convert from an analog signal format to a digital signal format during uplink signal processing and from a digital signal format to an analog signal format during downlink signal processing.

The Wi-Fi TX 1253*a* and the Wi-Fi RX 1253*b* which operate at the unlicensed spectrum are respectively used for transmitting and receiving modulated signals which could be wireless RF signals (through one or more antennas 1257) for Wi-Fi protocol module 1256*a*. The LTE-U TX 1254*a* and the LTE-U RX 1254*b* which operate in the unlicensed spectrum are respectively used for transmitting and receiving modulated signals which could be wireless RF signals (through one or more antennas 1257) for LTE-U signaling module 1256*b*. The unlicensed spectrum operated by the Wi-Fi TX 1253*a*, and the Wi-Fi RX 1253*b*, the LTE-U TX 1254*a*, and the LTE-U RX 1254*b* may be the same or different. In addition, the Wi-Fi TX 1253*a*, and the Wi-Fi RX 1253*b*, the LTE-U TX 1254*a*, and the LTE-U RX 1254*b* may be used for sensing the transmission of other devices in the unlicensed spectrum.

The memory module 1256 may be a fixed or a movable device in any possible forms including non-transitory computer readable recording medium such as a RAM, a ROM, a flash memory or other similar devices, or a combination of the above-mentioned devices.

Figure 13:
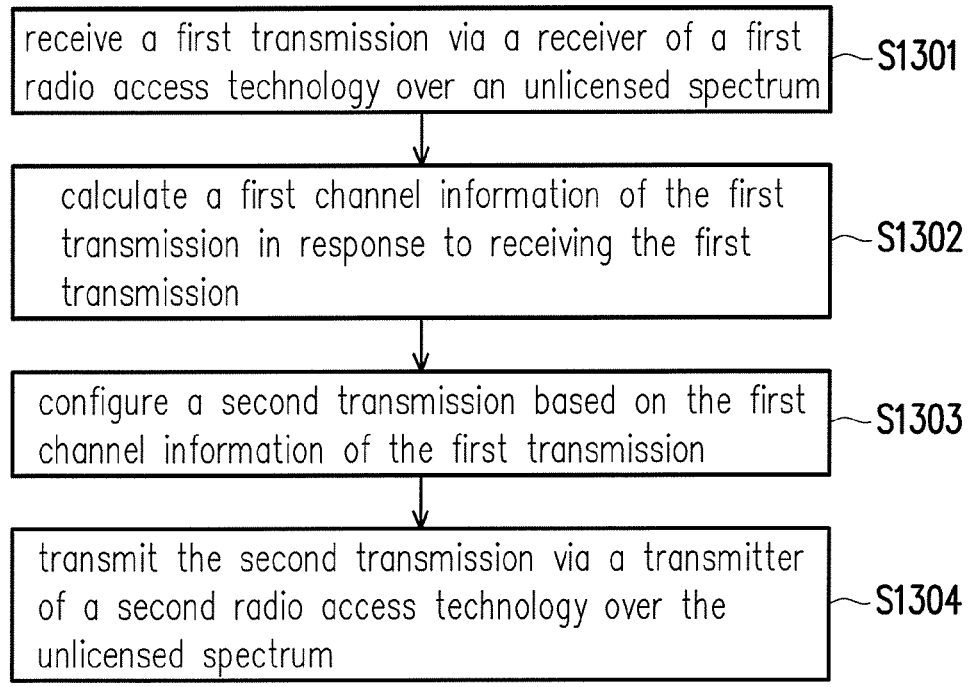
FIG. 13 is flow chart illustrating a signaling method for sharing an unlicensed spectrum between different radio access technologies used by a base station in accordance with one of the exemplary embodiments of the disclosure.
Figure 14:
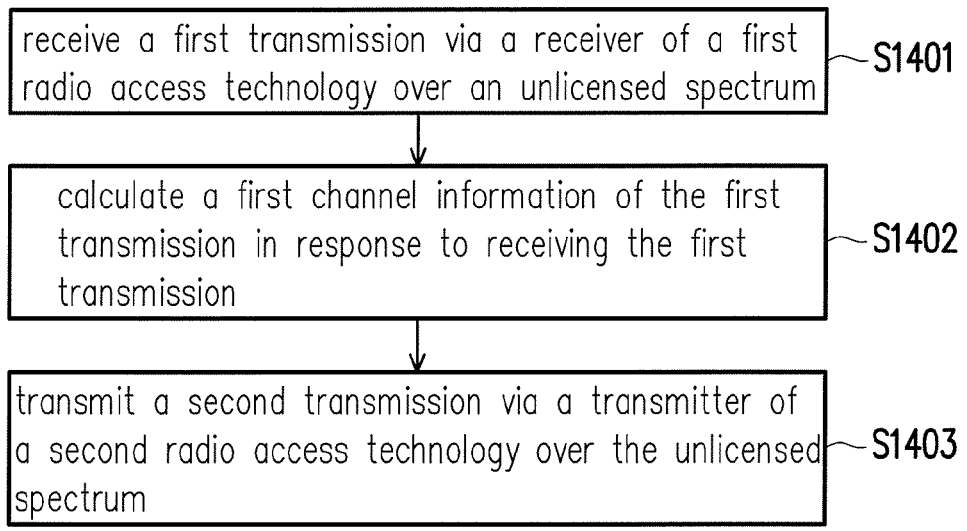
FIG. 14 is a flow chart illustrating a signaling method for sharing an unlicensed spectrum between different radio access technologies used by a multi-mode wireless device in accordance with one of the exemplary embodiments of the disclosure.
Figure 15:
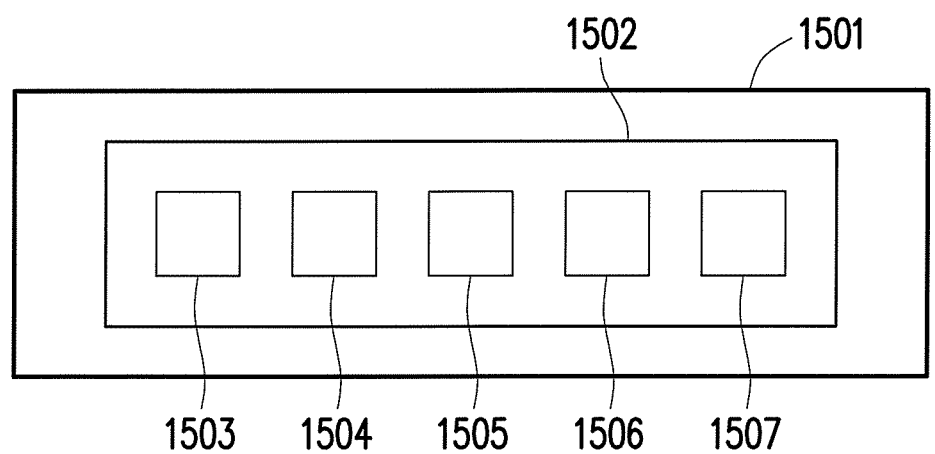
FIG. 15 illustrates contents of a configuration signaling message in accordance with one of the exemplary embodiments of the disclosure.

Before describing the proposed method as shown in FIG. 13 and FIG. 14, the signaling mechanism to implement the aforementioned unlicensed spectrum sharing is described herein. FIG. 15 illustrates contents of a configuration signaling message in accordance with one of the exemplary embodiments of the disclosure. Generally, there could be a signaling mechanism to make known the multi-mode capability of licensed-assisted access (LTE-U) and Wi-Fi to devices that are directly or indirectly attached to the base station by the way of using a capability signaling message 1502.

The capability signaling messages 1502 might be sent through an LTE-U radio interface (e.g., 1203*a*, 1203*b*). The capability signaling messages 1502 may also be sent through LTE radio interface (e.g., 1205*a*, 1205*b*) in the licensed spectrum or may also be sent The capability signaling message might be sent from a PCell control plane through a licensed band LTE interface (e.g., 1205*a*, 1205*b*) to indicate the multi-mode capability of LTE-U and Wi-Fi. The capability signaling messages 1502 might be sent through Wi-Fi radio interface (1204*a*, 1204*b*).

As a part of the signaling mechanism, there could be a co-located indicator 1503 or a co-located information element. Similarly, a correlation indicator (not shown) or a correlation indicator information element could also be used. The aforementioned indicators or information elements could be embedded within the capability signaling message. For example, the capability signaling message 1502 could be transmitted as a part of a System Information (SI) message, and there could be an one binary bit in a System Information Block (SIB) 1501 serving as an indicator 1503 or as an information element to indicate whether the co-located multi-mode operation is supported. The capability signaling message could be sent periodically by a multi-mode base station (eNB).

Additionally, a few bits of system information included in the SIB 1501 to describe the configuration of multi-mode radios. For example, the SIB 1501 may contain a mapping entry 1504 containing not limited to an identifier of the LTE (and/or LTE-U) base station (e.g., 200). The identifier could be, for example, a Cell ID, E-UTRAN cell identity (ECI) or an E-UTRAN cell global identifier (ECGI). The map entry 1504 may also contain an identifier of LTE (and/or LTE-U) wireless devices including, for example, a Cell RNTI (C-RNTI), a Temporary Mobile Subscribe Identity (M-TMSI), a S temporary mobile subscriber identity (S-TMSI), an IP address assigned by LTE network. The map entry 1504 may also contain an identifier of a Wi-Fi device, and the identifier could be, for example, an IEEE 802.11 MAC address or a IP address assigned by Wi-Fi network entity. The existing of the mapping entry 1504 might imply the correlation or co-location of the LTE-U radio interface and Wi-Fi interface. For example, if a wireless device is considered a co-located device, the mapping entry 1504 would indicate that the wireless device is considered a co-located device and would record the identifier of the device.

The capability signaling message 1502 may contain one binary bit 1505 to indicate whether the co-located multi-mode operation is supported might be include in a IEEE 802.11 beacon message. An IEEE 802.11 beacon messages might be sent periodically by multi-mode base station/access point. The capability signaling message 1502 may further contain a few bits of system information 1506 to describe whether the configuration of multi-mode radios might be include in an IEEE 802.11 beacon message. The capability signaling message 1502 may optionally include at least one an information element 1507 for further expansion.

When signaling message exchanges occur between a base station and devices attached to the base station, the signaling message may include indication of co-located multi-mode radio and mapping relationships between different radio access technologies such as between a LTE-U radio interface and a Wi-Fi radio interface. For example, a wireless device might transmit co-located information or mapping relationship information during a network entry process or an association process.

Similar to a base station, exemplary co-located information for a multi-mode wireless device may include an one binary bit to indicate whether the co-located multi-mode operation is supported, a few bits of system information to describe the configuration of multi-mode radios, and a mapping entry including an identifier of LTE (and/or LTE-U) base station. Examples of identifier may include Cell ID, E-UTRAN cell identity (ECI), and E-UTRAN cell global identifier (ECGI). The mapping table may further include identifier of other LTE (and/or LTE-U) wireless devices and Wi-Fi devices in communication with. The identifier of LTE wireless devices may include Cell RNTI (C-RNTI), Temporary Mobile Subscribe Identity (M-TMSI), S temporary mobile subscriber identity (S-TMSI), and IP address assigned by LTE network. The identifier of Wi-Fi devices may include IEEE 802.11 MAC address and IP address assigned by Wi-Fi network entity. The mapping entry may imply the correlation or co-location of the LTE-U radio interface and Wi-Fi interface.

When a wireless radio entity, regardless of whether it is a multi-mode wireless device or base station, receives a radio signal of a first source from one radio access technology and the radio signal (e.g., from a multi-mode co-located radio transmitter) is found to be correlated or substantially similar with radio signal of a second source received from the other radio access technology that uses the same or substantially the same unlicensed spectrum, then the first source could be considered to be co-located with the second source. This may occur if the transmitter of the first source and the transmitter of the second source are located on the same device or are very close to each other. The wireless radio entity could either measure the received signal properties such as signal strength, interference level, MIMO matrix, and so forth or may receive measurements of these signal properties from an external source. The wireless radio entity could then use the measurement results to configure future radio communications of the other radio access technology with the first source and/or the second source that are considered to be co-located. The wireless radio entity may also transmit information based on such measurement results to other wireless radio entities such as another base station or another wireless device. The transmitted information could be used by the other base station or the another wireless device to configure future radio communications of the other radio access technology.

For example, if the wireless radio entity obtains LTE-U signal measurement results while either directly communicating with another wireless radio entity or overhearing communication from the another wireless radio entity, the LTE-U signal measurement result could be applied to configure Wi-Fi communication settings. Similarly, if the wireless radio entity obtains Wi-Fi signal measurements instead, the Wi-Fi signal measurements could be applied to configure LTE-U communication settings.

The measurement results could be feedback by using the same radio access technology channel. For example, measurements of Wi-Fi signal could be feedback from a Wi-Fi device to a Wi-Fi access point (AP) through the Wi-Fi data transmission. For another example, measurements of LTE-U signal could be feedback from LTE-U device to LTE-U eNB through a LTE control plane (e.g., through licensed band LTE PCell). Otherwise, measurement results may also be feedback using another radio access technology channel. In this case, the co-located information (or correlated information) and measurement results might be used for providing channel state information feedback, interference level measurements, and adjustments of transmission channel coding mode (e.g., modulation and coding scheme; MCS).

For example, conventional Wi-Fi devices may use frame loss rate as an indicator for link adaptation (e.g., select the MCS for data transmission). By having information of the unlicensed band quality condition, the link adaptation decisions could be made by taking these information into consideration. Also, information of the unlicensed band quality condition could be used to adjust MIMO transmission configuration (e.g., MIMO pre-coding selection) and to decide re-transmission policy such as the number of maximum retry limit.

FIG. 13 is flow chart illustrating a signaling method for sharing an unlicensed spectrum between different radio access technologies used by a base station in accordance with one of the exemplary embodiments of the disclosure. The base station may have a LTE-U receiver and a Wi-Fi receiver that are co-located. One of the underlying premises is that if a frequency is shared completely or substantially between two radio access technologies, the channel information (e.g., channel state information, interference level) might be similar. In that case, the channel information obtained or overhead from one radio access technology could be assumed to be the channel status for another radio access technology such that excessive channel measurements could be spared. Therefore, before executing step S1301, the base station could obtain channel information of one radio access technology from another radio access technology by assuming that the channel information would have been similar or by relying previous channel information measurement or acquisition.

In step S1301, the base station would receive a first transmission via a receiver of the base station of a first radio access technology over an unlicensed spectrum. The first transmission could be received from another multi-mode wireless device that supports multiple radio access technologies such as LTE-U and Wi-Fi (e.g., S601). For example, the multi-mode wireless device may have a co-located LTE-U receiver and a Wi-Fi receiver. In step S1302, the base station would calculate a channel information of the first transmission in response to receiving the first transmission (e.g., S602). Alternative to step S1302, the base station could obtain the channel information from an external source such as the multi-mode wireless device itself if another device such as the multi-mode wireless device has already measured the channel. In step S1303, the base station would configure a second transmission based on the first channel information of the first transmission (e.g., S604). In step S1304, the base station would transmit the second transmission via a transmitter of a second radio access technology over the unlicensed spectrum. The second transmission could be a steady stream of user data that is configured based on channel information (e.g., S603) or the second transmission could be a feedback information including the calculated channel information that is to be communicated to an external source.

In step S1301, receiving the first transmission via the receiver of the first radio access technology over the unlicensed spectrum could be accomplished by overhearing a third transmission that is transmitted from a multi-mode first wireless device intended toward a second wireless device which is not the base station (e.g., S501). The third transmission is actually not intended for the base station but for the second wireless device which may not have co-located transceivers of Wi-Fi and LTE-U radio access technologies. However, if the channel information of the first radio access technology between the base station and the multi-mode first wireless device is similar to the channel information of the second radio access technology between the base station and the multi-mode first wireless device, then the channel information associated with the second radio access technology could be calculated based on the third transmission associated with the first radio access technology in order to be used for subsequent transmissions via the second radio access technology.

Also, before the step S1304, the base station could transmit a fourth transmission which includes the first channel information to the multi-mode first wireless device via the transmitter of the second radio access technology over the unlicensed spectrum in order to inform the multi-mode first wireless device of the calculated first channel information back in step S1302 so that the calculated first channel information could be made available to the multi-mode first wireless device wireless device.

It should be noted that the configuration performed in step S1303 to configure the second transmission to the first multi-mode wireless device could also be used or re-used to configure one or more other devices in the same vicinity as the first multi-mode wireless device or could have similar channel characteristics as the communication between the base station and the wireless device. In this way, superfluous measurements and calculations could be minimized.

Similar to steps S1301~S1304, the base station may also obtain channel information after a transmission. For example, the base station may transmit via a transmitter of the first radio access technology of the base station a fifth transmission to a first wireless device over the unlicensed spectrum (e.g., S101). Subsequently, the base station may receive via a receiver of the second radio access technology of the base station a sixth transmission from a second multi-mode wireless device over the unlicensed spectrum. The sixth transmission may include a feedback information of the fifth transmission transmitted from the second multi-mode wireless device over the unlicensed spectrum. The feedback information may include a second channel information from the base station to the second multi-mode wireless device. Subsequently, the base station may configure a seventh transmission based on the second channel information and transmit the seventh transmission via the transmitter of the second radio access technology over the unlicensed spectrum.

The above mentioned first radio access technology could be either LTE-U or Wi-Fi, and the second radio access technology is different from the first radio access technology and could also be either LTE-U or Wi-Fi.

Before step S1301, the base station may transmit a capability signaling message to indicate that it supports multiple radio access technologies. The capability signaling message may contain a co-located indicator to indicate that it supports a co-located mode of transmission for which similar channel information could be assumed for communication channels of different radio access technologies by using co-located radio transceivers. A plurality of radio transceivers could be defined as being "co-located" if their channel(s) of communication over a specific spectrum with another device is substantially the same or similar; otherwise, two radio transceivers could be considered as "co-located" if they are close in vicinity or are disposed in the same apparatus. The capability signaling message may also contain mapping information of co-located devices. As mentioned previously, the mapping information may contain, for example, co-located indicator which indicates whether an external device is considered co-located with the base station and an identifier of the external device.

FIG. 14 is a flow chart illustrating a signaling method for sharing an unlicensed spectrum between different radio access technologies used by a multi-mode wireless device in accordance with one of the exemplary embodiments of the disclosure. In step S1401, the multi-mode wireless device may receive a first transmission via a receiver of a first radio access technology over an unlicensed spectrum (e.g., 101). In step S1402, the multi-mode wireless device may calculate a first channel information of the first transmission in response to receiving the first transmission (e.g., S104). In step S1403, the multi-mode wireless device may transmit a second transmission via a transmitter of a second radio access technology over the unlicensed spectrum (e.g., S103). The principle of operation of a multi-mode wireless is similar to a base station and thus a description it not repeated. FIG. 1~FIG. 9 and their corresponding written descriptions illustrates various exemplary embodiments of the method as disclosed in FIG. 13 & FIG. 14 and their corresponding written descriptions.

FIG. 1 is a signaling diagram which illustrates a method of sharing an unlicensed spectrum between different access technologies which involves a channel measurement in accordance with one of the exemplary embodiment of the disclosure.

In general, if a first multi-mode wireless device has multiple transceivers of different radio access technologies which cover the same or substantially the same unlicensed frequency spectrum, the multiple transceivers which communicate with a second multi-mode wireless device may have the same or similar channel characteristics during communications of different radio access technologies with the second multi-mode wireless device over the unlicensed frequency spectrum. Also, the communication between the first multi-mode wireless device and the second multi-mode wireless device does not have to be direct. In fact, the first multi-mode wireless device may obtain a channel characteristics between a communication channel between the first multi-mode wireless device and the second multi-mode wireless device by indirectly overhearing communications between the second multi-mode wireless device and a third device. The same holds true for the second multi-mode wireless device. By the knowing channel characteristics of one radio access technology, the same channel characteristics could be re-used for communications of a second radio access technology thus extra measurements would not be required.

The exemplary embodiment involves at least a multi-mode base station 11, a multi-mode wireless device 15 that supports at least LTE-U as well as Wi-Fi, and a UE such as a Wi-Fi device 13. The multi-mode base station 11, and the multi-mode wireless device 15 are co-located devices.

In step S101, the base station 11 transmits a Wi-Fi data via a first radio access technology (e.g., Wi-Fi), and the Wi-Fi data is intended to be received by the Wi-Fi device 13. In step S102, the Wi-Fi data intended for the Wi-Fi device 13 was overhead by the multi-mode wireless device 15 over a first channel. In step S104, the multi-mode wireless device 15 could perform a measurement of the first channel based on overhearing of the Wi-Fi data even though the Wi-Fi data is not intended for the multi-mode wireless device 15. In step S103, the multi-mode wireless device 15 could transmit LTE-U data over a second channel via a second radio access technology (e.g., LTE-U) according to the measurement of step S104. In this way, the channel information between the base station 11 and the multi-mode wireless device 15 for the LTE-U radio access technology would have been known by over hearing communications of a different radio access technology even though no channel measurements have been performed by the LTE-U transmitter and receiver (i.e., transceiver).

Figure 2:
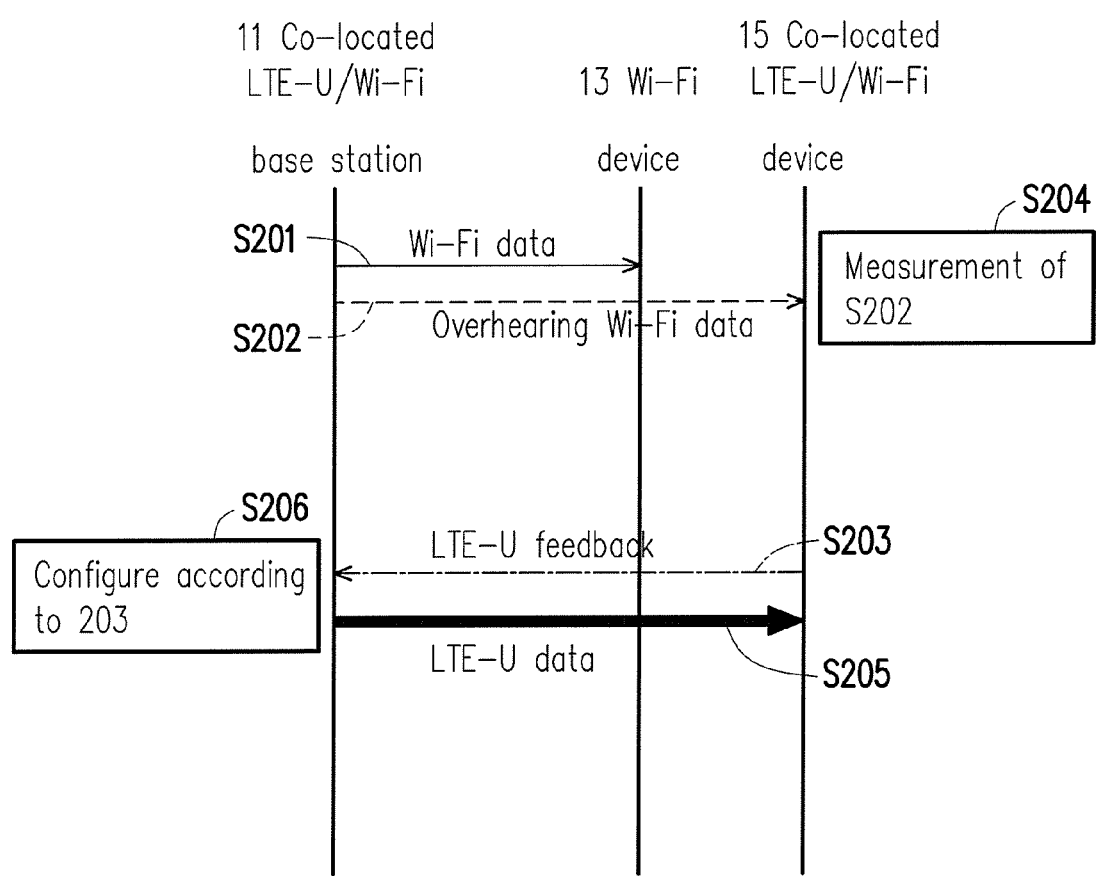
FIG. 2 illustrates a signaling diagram which illustrates a method of sharing an unlicensed spectrum between different radio access technologies which involves an information feedback in accordance with one of the exemplary embodiment of the disclosure.

To expand upon the exemplary embodiment of FIG. 1, the exemplary embodiment of FIG. 2 may involve feedback information to the multi-mode base station and a configuration by the base station according to the feedback information. In step S201, the base station 11 transmits a Wi-Fi data via a first radio access technology (e.g., Wi-Fi) that contains user payload, and the Wi-Fi data is intended to be received by the Wi-Fi device 13. In step S202, the Wi-Fi data intended for the Wi-Fi device 13 is overhead by the multi-mode wireless device 15 over a first channel. In step S204, the multi-mode wireless device 15 could perform a measurement of the first channel based on overhearing of the Wi-Fi data. In step S203, the multi-mode wireless device 15 could would transmit a feedback information which contains at least the channel information such as the channel state information, interference level, recommended MIMO-precoder matrix, and so forth over the second channel via a second radio access technology (e.g., LTE-U) according to the measurement of step S204. In step S206, the base station may configure a next transmission to the co-located multi-mode wireless device 15 as well as subsequent transmissions over the second channel by using the second radio access technology based on the feedback information received from step S203, since the channel characteristics of the Wi-Fi transmission over unlicensed spectrum would considered the same or very similar to the channel characteristics of the LTE-U transmission.

It should be noted that the configuration performed in step S206 could also be used or re-used to configure one or more other devices that are in the same vicinity as the co-located multi-mode wireless device 15 or could have similar channel characteristics as the communication between the base station 11 and the co-located multi-mode wireless device 15. In this way, superfluous measurements and calculations could be minimized. This concept holds true for embodiments of FIG. 3~FIG. 9.

Figure 3:
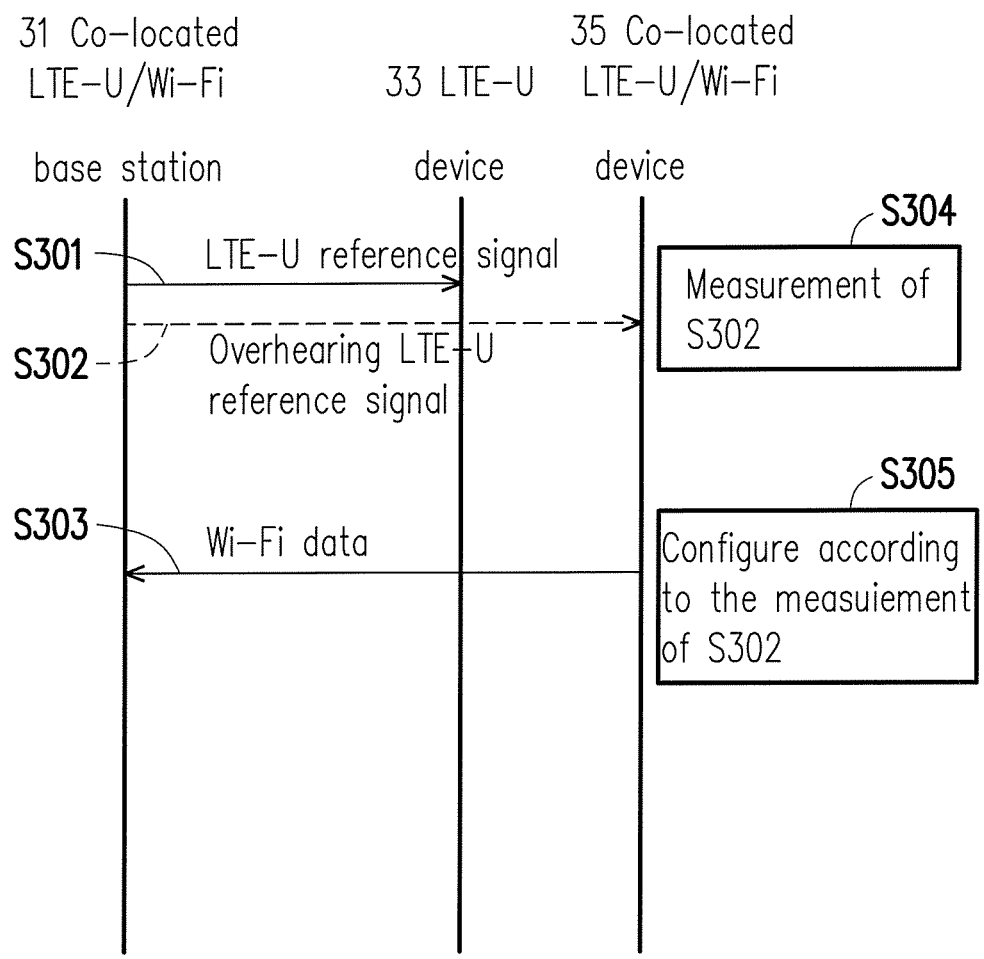
FIG. 3 illustrates is a signaling diagram which illustrates a method of sharing an unlicensed spectrum between different radio access technologies which involves a channel measurement and a subsequent configuration based on the channel measurement in accordance with one of the exemplary embodiment of the disclosure.

The exemplary embodiment of FIG. 3 is similar to the exemplary embodiments of FIG. 1 but both the measurement and the subsequent configuration is performed by the multi-mode wireless device and the radio access technologies are different. In step S301, the multi-mode base station 31 transmits a LTE-U reference signal via a first radio access technology (e.g., LTE-U), and the LTE-U reference is intended to be received by the LTE-U device 33. In step S302, the LTE-U reference signal intended for the LTE-U device 33 was overheard by the multi-mode wireless device 35 over a first channel. In step S304, the multi-mode wireless device 35 could perform a measurement of the first channel based on overhearing of the LTE-U reference signal. In step S305, the multi-mode wireless device 35 could configure a next transmission over the second channel via a second radio access technology (e.g., Wi-Fi) to the base station 31 as well as a plurality of subsequent transmissions. In step S303, the multi-mode wireless device 35 would transmit Wi-Fi data over the second channel via a second radio access technology (e.g., Wi-Fi) according to the configuration of step S305.

Figure 4:
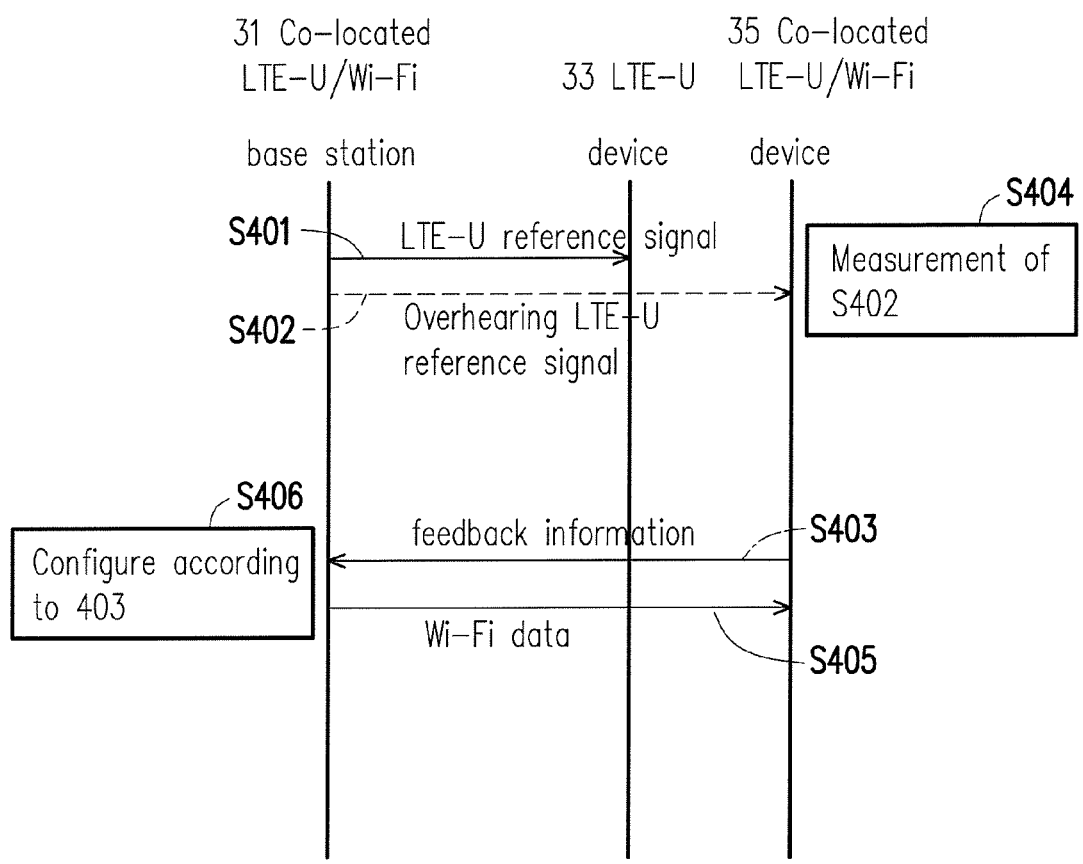
FIG. 4 illustrates is a signaling diagram which illustrates a method of sharing an unlicensed spectrum between different radio access technologies involving a channel measurement, a feedback information, and a subsequent configuration based on the feedback information in accordance with one of the exemplary embodiment of the disclosure.

To expand upon the exemplary embodiment of FIG. 3, the exemplary embodiment of FIG. 4 may involve feedback information to a base station and a configuration by the base station according to the feedback information. In step S401, the base station 31 transmits a LTE-U reference signal via a first radio access technology (e.g., LTE-U), and the LTE-U reference signal is intended to be received by the LTE-U device 33. In step S402, the LTE-U reference signal intended for the LTE-U device 33 is overhead by the multi-mode wireless device 35 over a second channel which intrinsically contains a first channel information. In step S404, the multi-mode wireless device 35 could perform a measurement of the first channel based on overhearing of the LTE-U reference signal. In step S403, the multi-mode wireless device 35 could would transmit a feedback information which contains at least the channel information such as the channel state information, interference level, recommended MIMO-precoder matrix, and so forth over the second channel via a second radio access technology (e.g., Wi-Fi) according to the measurement of step S404. In step S406, the base station 31 may configure a next transmission to the co-located wireless device 35 as well as subsequent transmissions over the second channel by using the second radio access technology based on the feedback information received from step S403. In step S405, the base station 31 may transmit Wi-Fi data over the second channel by using the second radio access technology based on the configuration of step S406.

Figure 5:
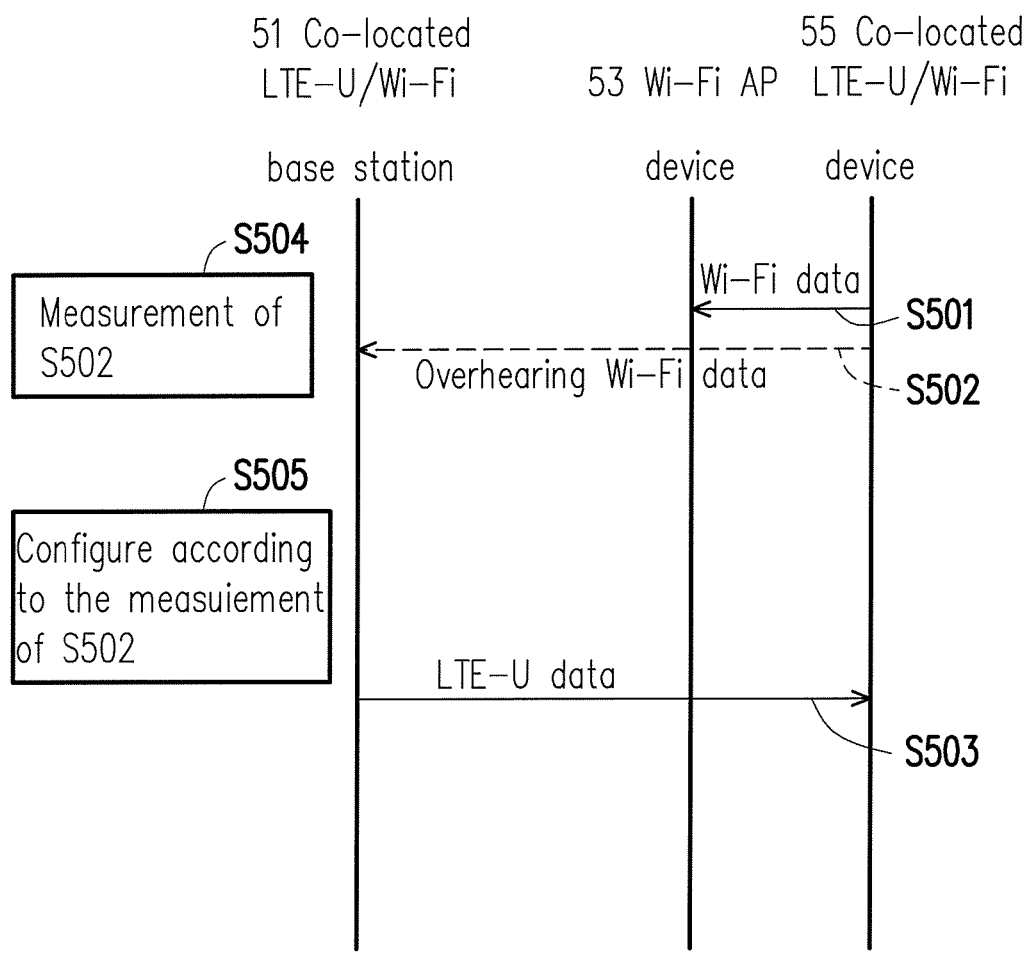
FIG. 5 illustrates a signaling diagram which illustrates a method of sharing an unlicensed spectrum between different radio access technologies which involves a channel measurement and a subsequent configuration based on overhearing a transmission in accordance with one of the exemplary embodiment of the disclosure.

FIG. 5 illustrates a signaling diagram which illustrates a method of sharing an unlicensed spectrum between different radio access technologies which involves a channel measurement and a subsequent configuration based on overhearing a transmission in accordance with one of the exemplary embodiment of the disclosure. The exemplary embodiment of FIG. 5 involves at least a multi-mode base station 51, a Wi-Fi AP 53, and a multi-mode wireless device 55 which are co-located. In step S501, the multi-mode wireless device 55 would transmit Wi-Fi data by using W-Fi radio access technology (i.e., by using a Wi-Fi transceiver 1253a 1253b), and the Wi-Fi data is intended to be received by the Wi-Fi AP 53. In step S502, the transmission of step S501 is overheard by the base station 51 over a first channel. In step S504, the base station 51 would perform a channel measurement and a subsequent channel calculation based on the overhearing of the Wi-Fi data in step S502. In step S505, the base station 51 would configure a next transmission based on the channel measurement of step S504 to the multi-mode wireless device 55 over the second channel by using the LTE-U radio access technology (i.e., by using the LTE-U transceiver 1203a 1203b). In step S503, the base station 51 would transmit LTE-U data to the multi-mode wireless device 55 based on the configuration of step S505. The configuration may include not limited to setting a MIMO-precoding matrix based on the channel measurement of step S504.

Figure 6:
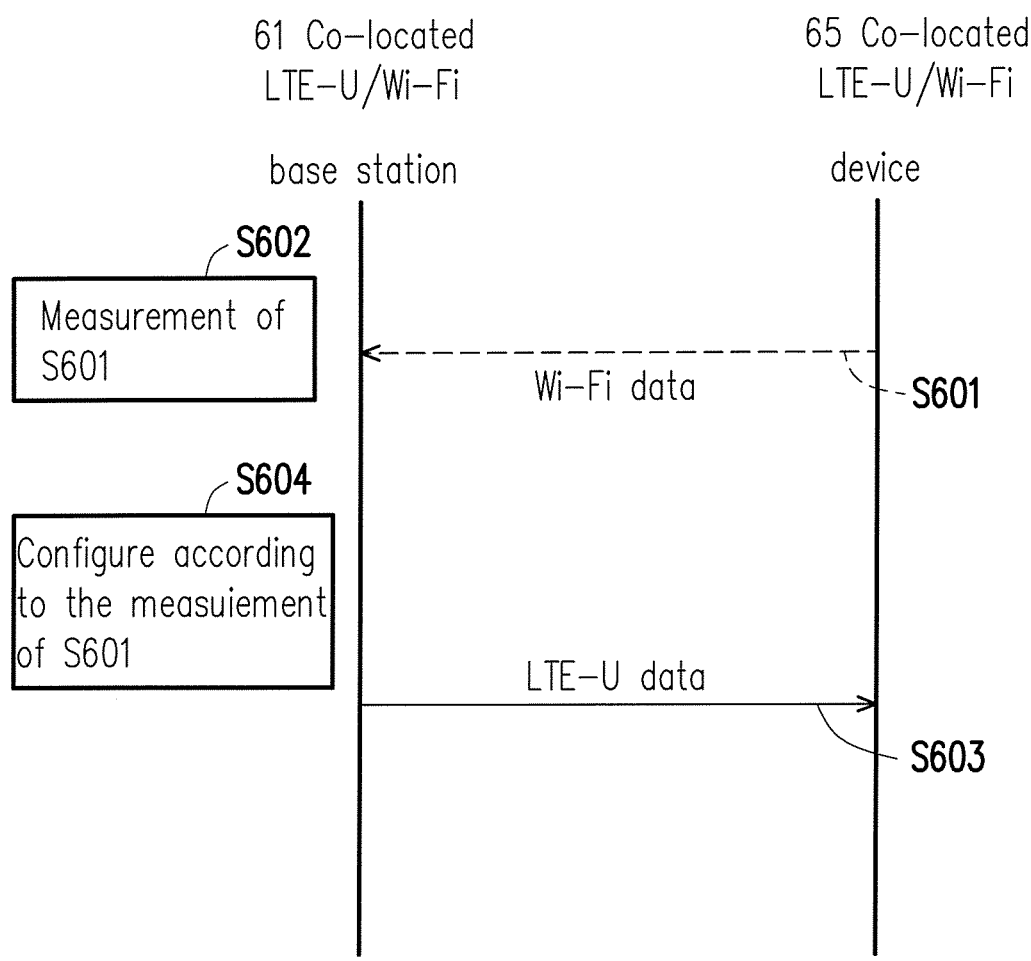
FIG. 6 illustrates a signaling diagram which illustrates a method of sharing an unlicensed spectrum between the licensed-assisted access (LTE-U) and Wi-Fi radio access technologies in accordance with one of the exemplary embodiment of the disclosure.

FIG. 6 illustrates a signaling diagram which illustrates a method of sharing an unlicensed spectrum between the licensed-assisted access (LTE-U) and Wi-Fi radio access technologies in accordance with one of the exemplary embodiment of the disclosure. The exemplary embodiment of FIG. 6 involves at least a multi-mode base station 61 and a multi-mode wireless device 65 which are co-located. In step S601, the multi-mode wireless device 65 transmits Wi-Fi data by using Wi-Fi radio access technology to the base station 61. In step S602, the base station 61 would perform a channel measurement and calculation based on the Wi-Fi data of step S601 to obtain channel information such as channel state information and interference level. The Wi-Fi data of step S601 may also optionally contain a recommended MIMO-precoder matrix. In step S604, the base station 61 may configure a next transmission over a second channel based on the measurement and calculation of step S602. In step S603, the base station 61 would transmit LTE-U data by using LTE-U radio access technology to the multi-mode wireless device 65.

Figure 7:
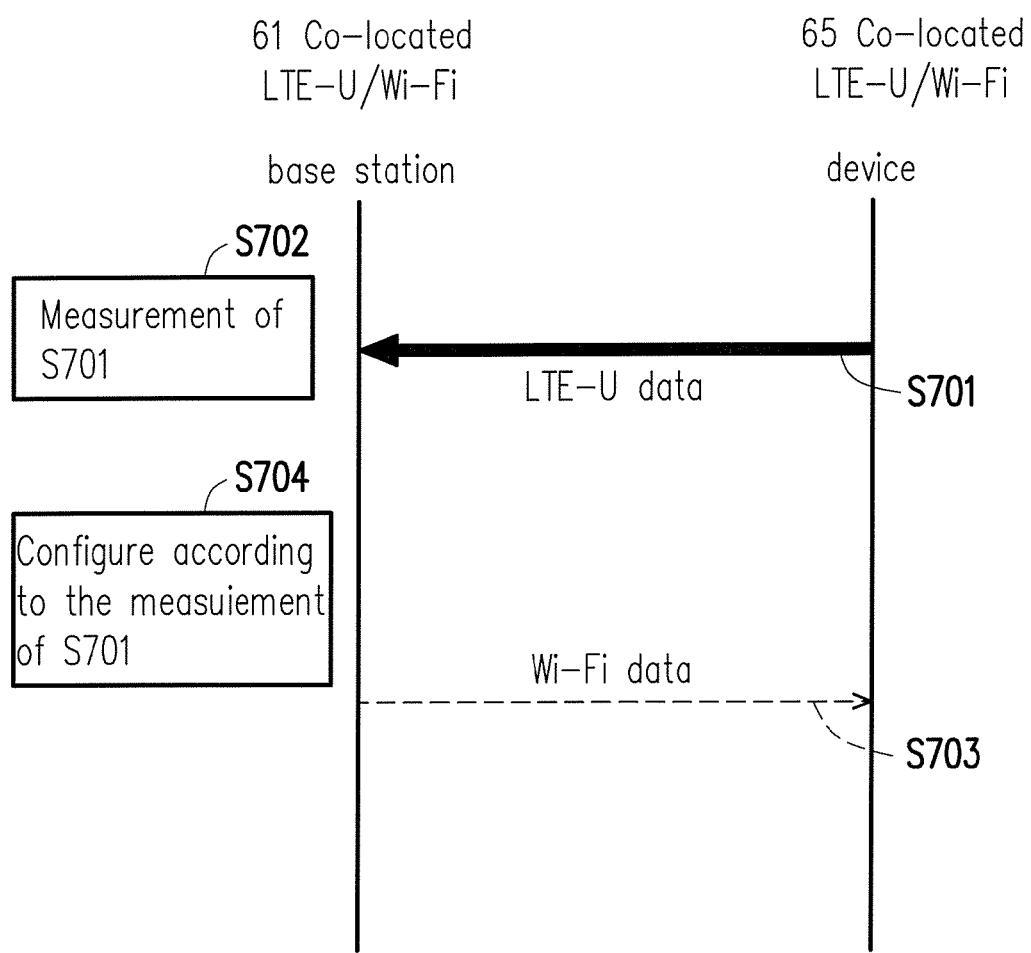
FIG. 7 illustrates a signaling diagram which illustrates a method of sharing an unlicensed spectrum between the licensed-assisted access (LTE-U) and Wi-Fi radio access technologies in accordance with another one of the exemplary embodiment of the disclosure.

FIG. 7 illustrates a signaling diagram which illustrates a method of sharing an unlicensed spectrum between the licensed-assisted access (LTE-U) and Wi-Fi radio access technologies in accordance with another one of the exemplary embodiment of the disclosure. The exemplary embodiment of FIG. 7 involves at least a multi-mode base station 61 and a multi-mode wireless device 65 which are co-located. In step S701, the multi-mode wireless device 65 transmits LTE-U data by using LTE-U radio access technology to the base station 61. In step S702, the base station 61 would perform a channel measurement and calculation based on the LTE-U data of step 701 to obtain channel information such as channel state information and interference level. The LTE-U data of step S701 may also optionally contain a recommended MIMO-precoder matrix. In step S704, the base station 61 may configure a next transmission over a second channel based on the measurement and calculation of step S702. In step 703, the base station 61 would transmit Wi-Fi data by using Wi-Fi radio access technology to the multi-mode wireless device 65.

Figure 8:
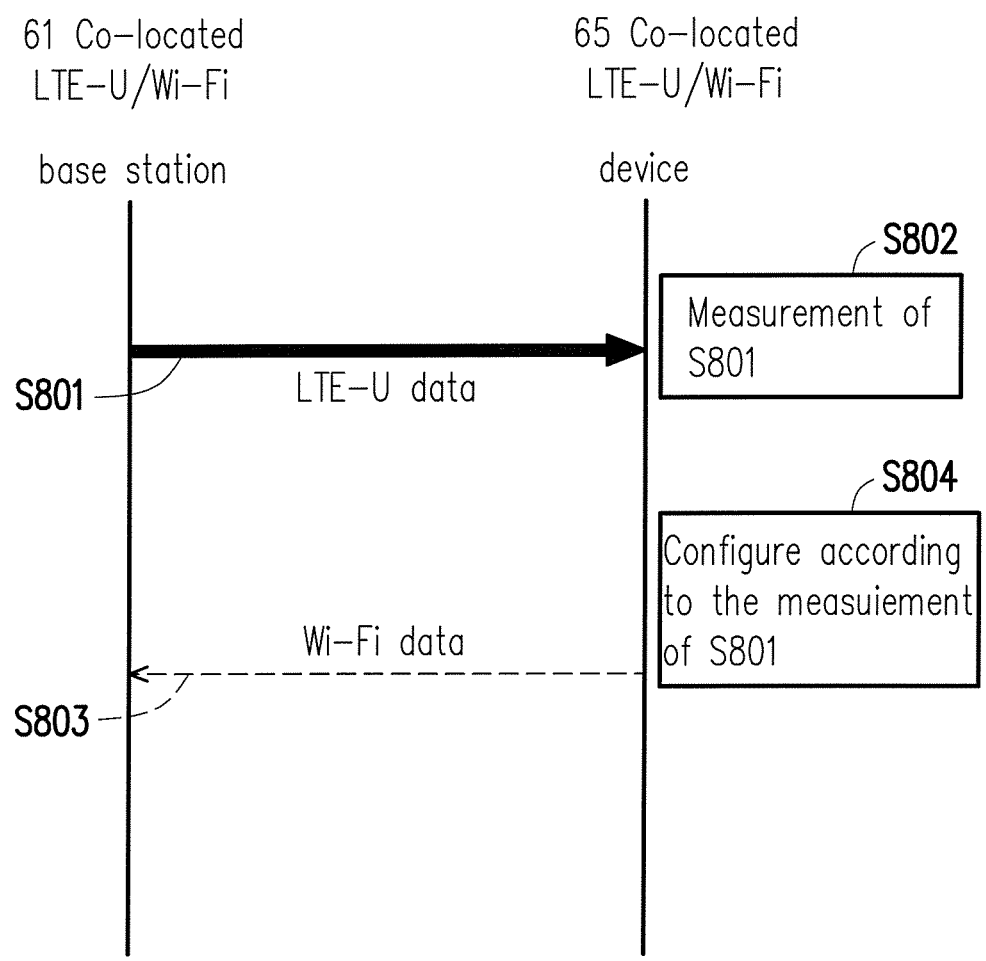
FIG. 8 illustrates a signaling diagram which illustrates a method of sharing an unlicensed spectrum between the licensed-assisted access (LTE-U) and Wi-Fi radio access technologies in accordance with a variation similar to FIG. 7 of the disclosure.

FIG. 8 illustrates a signaling diagram which illustrates a method of sharing an unlicensed spectrum between the licensed-assisted access (LTE-U) and Wi-Fi radio access technologies in accordance with a variation similar to FIG. 7 of the disclosure. The exemplary embodiment of FIG. 8 involves at least a multi-mode base station 61 and a multi-mode wireless device 65 which are co-located. In step 801, the multi-mode wireless device 65 receives LTE-U data by using LTE-U radio access technology from the base station 61. In step S802, the multi-mode wireless device 65 would perform a channel measurement and calculation based on the LTE-U data of step 801 to obtain channel information such as channel state info illation and interference level. The LTE-U data of step S801 may also optionally contain a recommended MIMO-precoder matrix. In step S803, the multi-mode wireless device 65 may configure a next transmission over a second channel based on the measurement and calculation of step S802. In step S803, the multi-mode wireless device 65 would transmit Wi-Fi data by using Wi-Fi radio access technology to the multi-mode wireless device 65.

Figure 9:
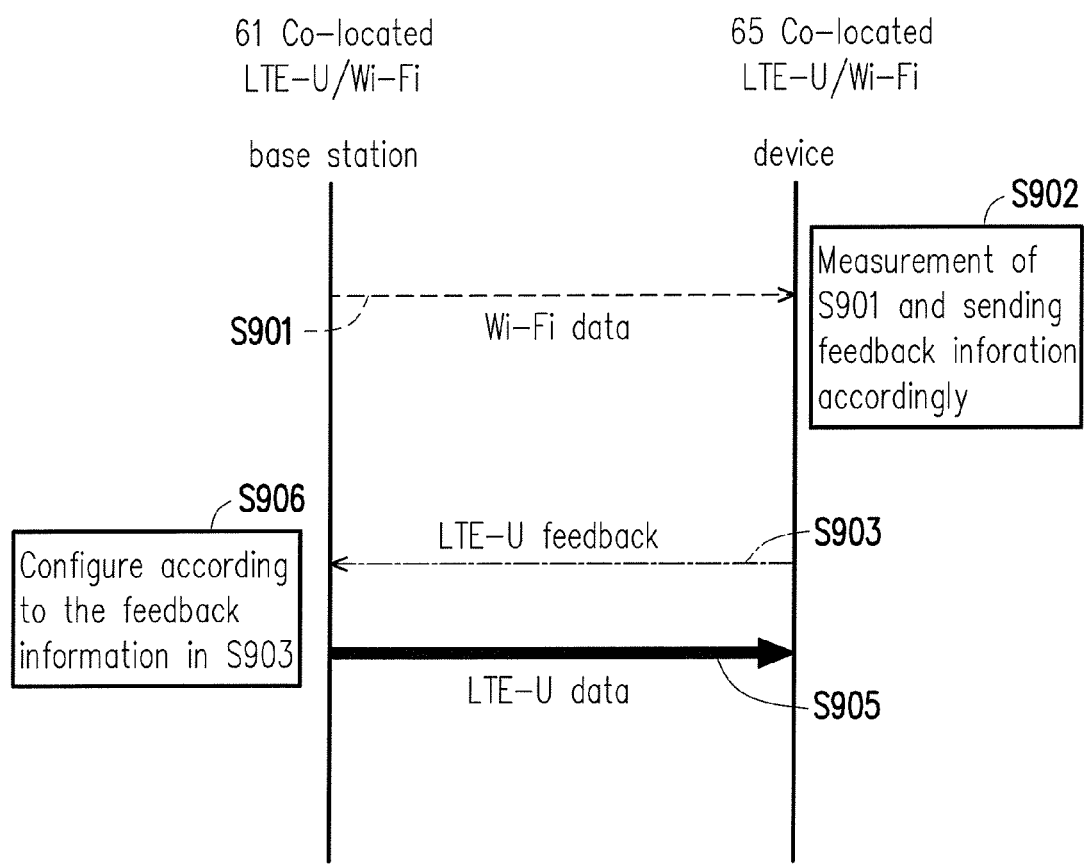
FIG. 9 illustrates a signaling diagram which illustrates a method of sharing an unlicensed spectrum between the licensed-assisted access (LTE-U) and Wi-Fi radio access technologies involving a channel feedback and a subsequent configuration in accordance with one of the exemplary embodiment of the disclosure.

FIG. 9 illustrates a signaling diagram which illustrates a method of sharing an unlicensed spectrum between the licensed-assisted access (LTE-U) and Wi-Fi radio access technologies involving a channel feedback and a subsequent configuration in accordance with one of the exemplary embodiment of the disclosure. The exemplary embodiment of FIG. 9 involves at least a multi-mode base station 61 and a multi-mode wireless device 65 which are co-located. In step S901, the base station 61 would transmit Wi-Fi data by using a Wi-Fi transmitter over a first channel to the multi-mode wireless device 65. In step S902, the multi-mode wireless device 65 would perform channel measurement and calculation to derive channel information of the first channel based on Wi-Fi data. In step S903, the multi-mode wireless device 65 transmit a feedback information containing the measurement of step S902 to the base station 61 by using a LTE-U transmitter. In step S906, the base station 61 would configure transmission to the multi-mode wireless device 65 as well as other co-located devices based on the LTE-U feedback. In step S905, the base station 61 would transmit LTE-U data over a second channel to the multi-mode wireless device 65.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A signaling method for sharing an unlicensed spectrum between different radio access technologies used by a base station that supports multiple radio access technologies, the method comprising:
receiving a first transmission via a receiver of a first radio access technology over an unlicensed spectrum by overhearing a third transmission that is transmitted from a first multi-mode wireless device intended toward a second wireless device which is not the base station;
calculating a first channel information of the first transmission in response to receiving the first transmission;
configuring a second transmission based on the first channel information of the first transmission; and
transmitting the second transmission via a transmitter of a second radio access technology over the unlicensed spectrum.

2. The method of claim 1, wherein before transmitting the second transmission, claim 1 further comprising:
transmitting a fourth transmission which comprises the first channel information to the first multi-mode wireless device via the transmitter of the second radio access technology over the unlicensed spectrum.

3. The method of claim 1 further comprising:
transmitting via a transmitter of the first radio access technology a fifth transmission to a first wireless device over the unlicensed spectrum; and
receiving via a receiver of the second radio access technology a sixth transmission from a second multi-mode wireless device over the unlicensed spectrum.

4. The method of claim 3 further comprising:
receiving via a receiver a feedback information of the fifth transmission from the second multi-mode wireless device over the unlicensed spectrum, wherein the feedback information comprises a second channel information from the base station to the second multi-mode wireless device;
configuring a seventh transmission based on the second channel information; and
transmitting the seventh transmission via the transmitter of the second radio access technology over the unlicensed spectrum.

5. The method of claim 1, wherein the first radio access technology is either LTE-U or Wi-Fi, and the second radio access technology is different from the first radio access technology and is either LTE-U or Wi-Fi.

6. The method of claim 5, wherein before receiving the first transmission by overhearing the third transmission, claim 5 further comprising:
determining whether a co-located indicator within a capability signaling message has been set as active; and
correlating the first transmission to the third transmission in response to determining that the co-located indicator is set as active.

7. The method of claim 1, wherein before receiving the first transmission by overhearing the third transmission, claim 1 further comprising:
transmitting a capability signaling message to indicate support for multiple radio access technologies.

8. The method of claim 7, wherein the capability signaling message is embedded with a system information block and further comprising a mapping entry which correlates information between the first radio access technology and the second radio access technology.

9. A multi-mode base station capable of supporting multiple radio access technologies, the base station comprising:
a receiver of a first radio access technology configured for receiving a first transmission over an unlicensed spectrum by overhearing a third transmission that is transmitted from a first multi-mode wireless device intended toward a second wireless device which is not the base station;
a processor coupled to the receiver and is configured for calculating a channel information of the first transmission in response to receiving the first transmission; and configuring a second transmission based on the channel information of the first transmission; and
a transmitter of a second radio access technology coupled to the processor and is configured for transmitting the second transmission over the unlicensed spectrum.

10. The base station of claim 9, wherein before transmitting the second transmission, the transmitter of the second radio access technology further transmits a fourth transmission which comprises the first channel information to the first multi-mode wireless device via the second radio access technology over the unlicensed spectrum.

11. The base station of claim 9 further comprising:
a transmitter of the first radio access technology coupled to the processor and is configured for transmitting a fifth transmission to a first wireless device over the unlicensed spectrum; and
a receiver of the second radio access technology configured for receiving a sixth transmission from a second multi-mode wireless device over the unlicensed spectrum.

12. The base station of claim 11, the receiver of the second radio access technology receives a feedback information of the fifth transmission from the second multi-mode wireless device over the unlicensed spectrum, wherein the feedback information comprises a second channel information from the base station to the second multi-mode wireless device; and
the transmitter of the second radio access technology is configured for transmitting a seventh transmission over the unlicensed spectrum based on the second channel information.

13. The base station of claim 9, wherein the first radio access technology is either LTE-U or Wi-Fi, and the second radio access technology is different from the first radio access technology and is either LTE-U or Wi-Fi.

14. The base station of claim 13, wherein before the receiver of the first radio access technology receives the first transmission by overhearing the third transmission, the processor further configured to:
determining whether a co-located indicator within a capability signaling message has been set as active; and
correlating the first transmission to the third transmission in response to determining that the co-located indicator is set as active.

15. The base station of claim 9 further transmits a capability signaling message to indicate support for multiple radio access technologies before the receiver of the first radio access technology receives the first transmission by overhearing the third transmission.

16. The base station of claim 15, wherein the capability signaling message is embedded with a system information block and further comprising a mapping entry which correlates information between the first radio access technology and the second radio access technology.

17. A signaling method for sharing an unlicensed spectrum between different radio access technologies used by a multi-mode wireless device which supports multiple radio access technologies, the method comprising:

receiving a first transmission via a receiver of a first radio access technology over an unlicensed spectrum by overhearing a third transmission that is transmitted from a base station intended toward another wireless device which is not the multi-mode wireless device;
calculating a first channel information of the first transmission in response to receiving the first transmission;
configuring a second transmission based on the first channel information of the first transmission; and
transmitting the second transmission via a transmitter of a second radio access technology over the unlicensed spectrum.

18. The method of claim 17 further comprising:
determining whether a co-located indicator within a capability signaling message has been set as active; and
correlating the first transmission to the third transmission in response to determining that the co-located indicator is set as active.

19. The method of claim 18 further comprising:
configuring multiple transmissions to be transmitted via the transmitter of the second radio access technology over the unlicensed spectrum based on the first channel information of the first transmission in response to the first channel information of the first transmission being correlated to the second channel information of the third transmission.

20. The method of claim 17, wherein before receiving the first transmission by overhearing the third transmission, claim 17 further comprising:
transmitting a capability signaling message to indicate support for multiple radio access technologies.

21. The method of claim 20, wherein the capability signaling message is embedded with a system information block and further comprising a mapping entry which correlates information between the first radio access technology and the second radio access technology.

22. The method of claim 17, wherein the first radio access technology is either LTE-U or Wi-Fi, and the second radio access technology is different from the first radio access technology and is either LTE-U or Wi-Fi.

23. The method of claim 17, wherein in response to receiving the first transmission by overhearing a third transmission, claim 17 further comprising:
transmitting a feedback information comprising the first channel information to the base station in response to calculating the first channel information.

24. The method of claim 23, wherein the feedback information further comprises at least one of a MIMO precoder information, an interference level, and a signal strengths of the first transmission.

* * * * *